3,324,507
APPARATUS FOR MANUFACTURING HOLLOW ARTICLES

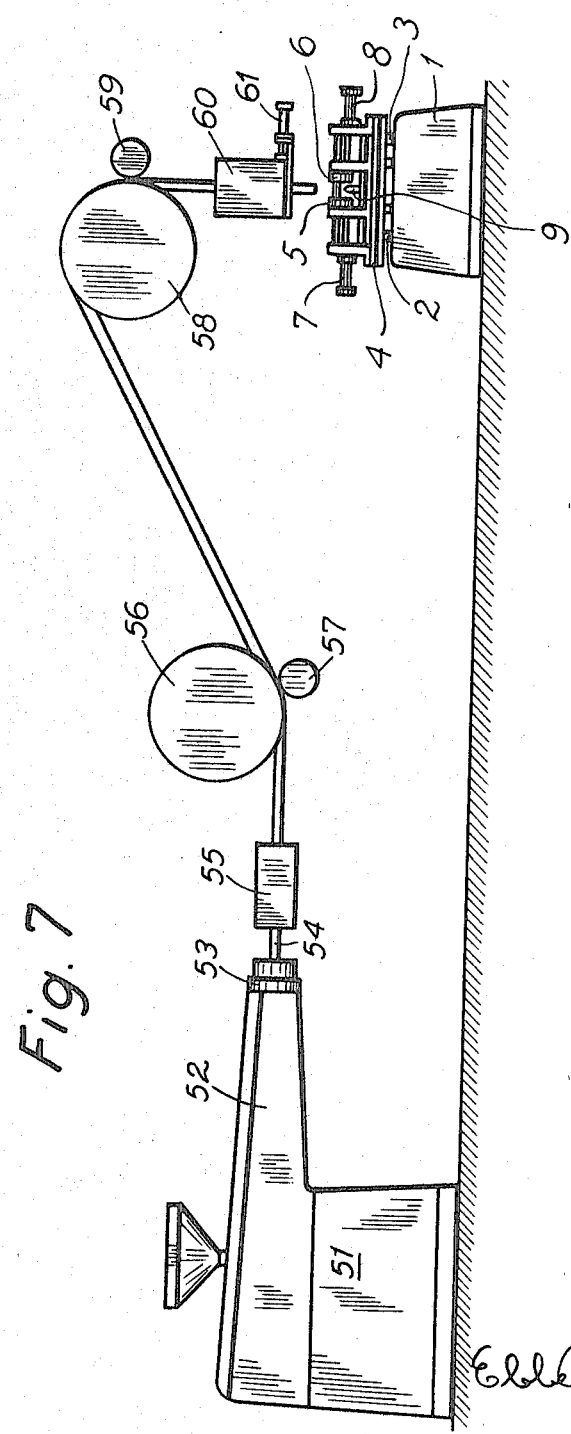

Ebbe Rolf Arlø, Copenhagen, Denmark, assignor, by mesne assignments, to Esso Chemical Company Inc., New York, N.Y.
Original application Feb. 26, 1962, Ser. No. 197,807, now Patent No. 3,265,788. Divided and this application Apr. 1, 1966, Ser. No. 540,794
9 Claims. (Cl. 18—5)

This application is a divisional application of Ser. No. 197,807, filed Feb. 26, 1962, now U. S. Patent No. 3,265,788.

The invention relates to an apparatus for manufacturing hollow articles in which plate or tubular material is rendered plastic by heating, and expanded in a mold.

During late years apparatus has been used where plastic material has been extruded in the shape of a hose, and the plastic material is in its still hot condition enclosed and blown up. After a certain time, when the plastic material has been stabilized, the mold is opened and the hollow body removed whereafter a fresh piece of hose is enclosed in the mold and so on. However, a number of difficulties have cropped up in this known apparatus seeing that it is impossible to undertake an effective adaptation of the plasticity of the material. For this reason it has been necessary to give up the manufacturing of certain articles from certain materials, especially polyvinylchloride, which must otherwise be considered a very favorable material for many purposes, especially when it is a question of obtaining tightness against permeation of certain liquids. Moreover, it is not possible in the hitherto known methods in many cases to obtain an attractive finely performed smooth surface, just as the known method can hardly give bottles of a clear transparent material.

In the known apparatus, the extruding takes place by means of an extruder having a horizontal extruder tube on which is arranged an angle head which, however, has an inclination to give an irregular wry hose. Wryness may also easily appear from air currents for the ventilation of the room in question. Finally, the extruding will cause that dust from the plastic raw material is spread in the room, and this may deposit itself on the pressed out hose.

It is the object of the invention to provide an improved apparatus in which the said drawbacks are fully or partly remedied. The characteristic feature of the invention is that the thermoplastic material is carried to the molding machine by means of a feeding mechanism which is synchronized with means for opening and closing the mold. In this manner, a very quick manufacture can be obtained. Moreover, it is possible to get a better product than by the known apparatus seeing that it is easy to get articles which are especially well suited for the heating and molding operation, e.g. calibrated hose pieces with an especially smooth outer side. On the whole, advantages will be obtained in many respects which will be easily realized by an expert.

As work pieces, it is advantageous to use tubular pieces which are arranged in individual holders in the transport mechanism. Such hose pieces can fairly easily be made with an exactly desired weight and thickness of goods thus obtaining a uniform product in the blowing molding.

As start material, it is advantageous to use tubular plastic material which is flat and has such properties that when heated it will assume a shape having substantially a circular cross section. Such flat tubular material is convenient for storing and transport. It is, moreover, easy to make, e.g. in the manner that hose material is extruded having a round cross section, and this hose material is flattened when it has such a temperature as will give rise to latent tensions in the material when same is flattened. Advantageously, the material may be used directly from a flat coiled-up condition. Thus, the material is particularly easy to store and transport. The material may with advantage be somewhat heated before the uncoiling. Such heating is of special importance in case of relatively stiff material such as polyvinylchloride. Another form of material used includes a tubular flat portion which is bent 180° with equally big intervals and alternatively to opposite sides to form equally long distances lying closely against each other. At the bends there may be incisions so that the pieces are only connected with each other by narrow connecting parts which are easily to break, possibly in cold condition.

The mold may with advantage be moved between two positions where in one position it is closed round a work piece fed by the transport mechanism whereafter it is in closed condition moved to the other position where it does not constitute any hindrance for the feeding of the next work piece. Thus, the transport mechanism may be constructed in a rather simple manner, e.g. with a horizontal feeding path for the work pieces.

The heating of the work pieces may advantageously take place by means of hot air. Thus, an even heating of the work pieces may be obtained, if desired, also in the interior of the tubular work pieces. The work pieces may advantageously be transported in vertical position held firm by holding members at the top. In this manner the work piece may be heated rather strongly without being deformed during the plastification in an unfortunate manner or without adhering to machine parts in a detrimental way. Work pieces having a through opening may with advantage be transported through a room having vertical currents of hot air. In this manner, part of the hot air will pass in through the work pieces thus heating the latter from the inside.

The invention furthermore relates to a machine that has a divided mold, means for the opening and closing of the mold, a transport mechanism for the transport of plastic work pieces through a heating apparatus, means for conveying the work pieces one at a time in between the mold parts, and means for blowing up a work piece placed in the closed mold. By means of such a machine, a quick and satisfactory production can be obtained. The transport mechanism may with advantage have an endless conveyor band with holders for the work pieces. In this manner, a simple and favorable machine is obtained. In order to get a sufficiently long heating period, it is possible to let the conveyor band move along some curved path, e.g. in waves to and fro or up and down or helically downwards. The mold may advantageously be arranged movably between two positions by means of a driving mechanism where in one position in open condition it encloses a work piece and is closed round the same whereafter it is moved to the other position where it does not constitute any hindrance for the feeding of the next work piece. In this manner, an especially practical construction is obtained as explained above. The mold may be movable in the vertical direction. This direction of movement has proved particularly advantageous. The mold may, however, instead be moved in another manner, e.g. by being swung about a horizontal or vertical axis. The transport mechanism may with advantage extend through a room through which a current of hot air is blown. In this manner, a favorable even heating of the work pieces may be obtained. The air current may advantageously be vertical. Thus, the heat can be distributed evenly in the whole length of vertically suspended work pieces. The transport mechanism may advantageously be arranged for the feeding of the work pieces in steps and for retaining each work piece for a short time at the place where the mold is brought to close round a work piece. In this manner, certainty can be obtained for having the work pieces in the correct position when the mold is closed.

The transport mechanism may with advantage have an endless path for separate conveyor elements the relative distance of which on the path can be varied and which have each at least one holder for a work piece. The conveyor elements may advantageously at least in a heating sector, be fed close to each other, while they are individually transferred from the heating sector to the place, where the mold closes, by means of a comparatively long movement in steps in the path. In this manner, the work pieces will stick fairly close together during the transport through the heating sector in which manner it is obtained that the latter can be constructed with comparatively small dimensions. The relatively long movement in steps insures that the nearest following work piece is at a safe distance behind during the closing of the mold.

The plastic material may advantageously be fed continuously through a heating apparatus, e.g. in case of a continuous band of plastic material. In this manner, it is in many cases possible to obtain a quick working and a uniform quality.

The plastic material may be subjected to a heating varying in the longitudinal direction. Thus, it will be possible to give the part which is to form the bottom of a bottle, and which is to be welded, an especially strong heating, whereas the remaining part of the length is heated less in which manner favorable molding and welding conditions are obtained. It will also be possible to vary the heating according to the circumferential direction, e.g. in the way that a certain zone is heated particularly strongly, e.g. in case this zone is to have a text printed on it or an object welded to it.

The plastic material may advantageously be fed with varying speed, e.g. in case of a continuous plastic band. Thus, it is possible in certain instances to obtain a suitable heating of different parts of the plastic material. Moreover, the movements may in this manner be made easier. The plastic band material may, moreover, advantageously be fed in steps, the length of the steps corresponding to the piece to be inserted into the mold. This will in many cases be the most advantageous carrying out of the method seeing that in this case it is obtained that it is unnecessary to move the mold as a whole which would otherwise normally be necessary. Moreover, the heating may in this manner be carried through in a particularly favorable way.

The plastic band material may be carried from an extruder to a heating apparatus. Thus, an even and quick manufacture is obtained. The plastic band material may after the extruding pass through a cooling and calibrating appartus. Thus, a material is obtained having a much more uniform character than by the usual direct feeding from extruder to mold. The plastic band material may be carried from an extruder having a horizontal direction of pressing out past guiding members to the inlet opening arranged at the top of a heating apparatus with a vertical path for the plastic material. In such an extruder with a horizontal pressing out direction it is possible to support the pressed out band effectively, and it is, therefore, permissible to allow the band to be pressed out with high temperature and a correspondingly considerable plasticity whereafter the band is cooled off on its path to the heating apparatus, e.g. by means of a calibrating apparatus in which manner a material is obtained having the uniform good quality required from extruded hoses, e.g. garden watering hoses. It is not necessary for the hose to be cooled to room temperature before the heating apparatus. On the contrary, it will, as a rule, be advantageous that it is only cooled to such an extent that it is stable and can stand the passage to the heating apparatus so that its interior has a rather considerable temperature.

To the heating apparatus may be fed stored plastic band material. This has in many cases very considerable advantages seeing that it will be easy to change between several qualities and colors. When carrying out the invention in this way it will furthermore be particularly convenient to produce comparatively small production runs which are very costly and unpractical in the hitherto known methods seeing that the adjustment and adaptation work in connection with the same is very great.

The drawing shows schematically three embodiments of a machine according to the invention, in which:

FIG. 7 is a schematic side view of a machine of a third embodiment.

Figure 1:
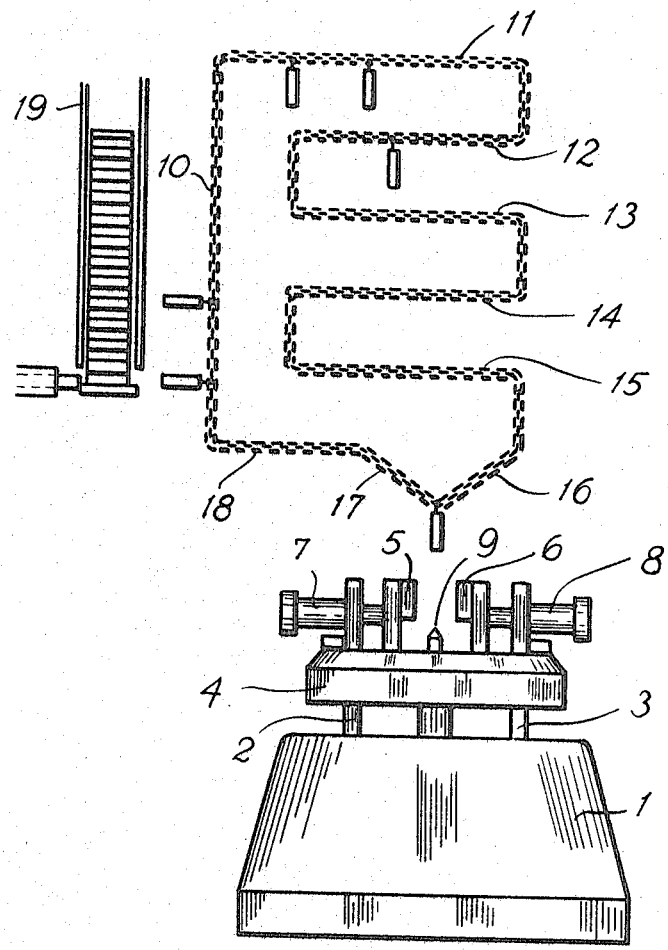
FIG. 1 shows a machine according to one embodiment in front view and with certain parts removed for the sake of clearness.
Figure 2:
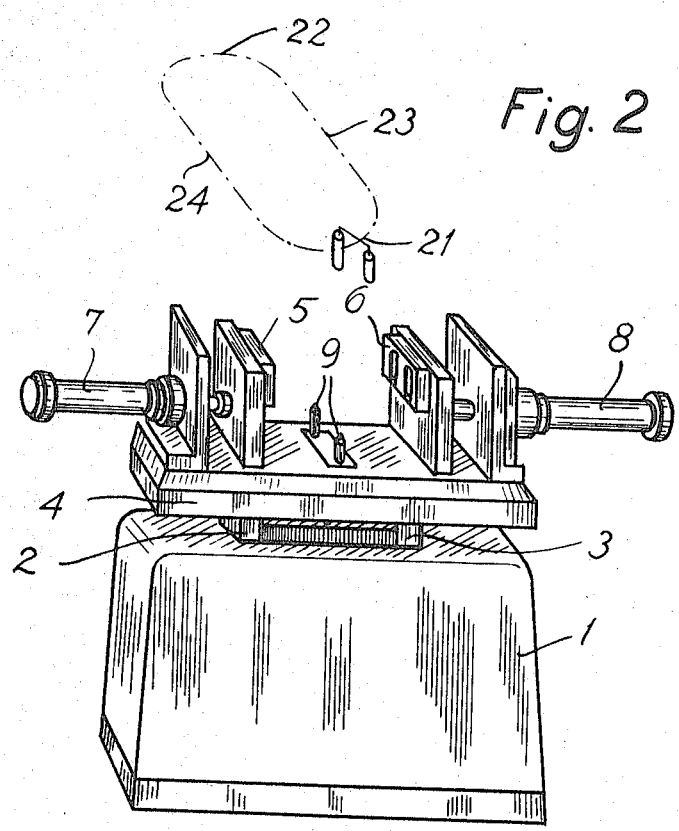
FIG. 2 is a perspective illustration of parts of a machine according to another embodiment.
Figure 3:
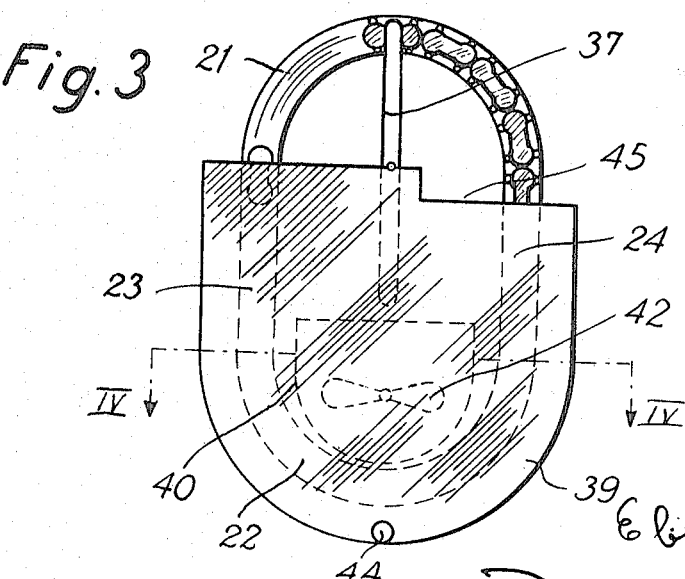
FIG. 3 is a top view of parts of the machine.
Figure 4:
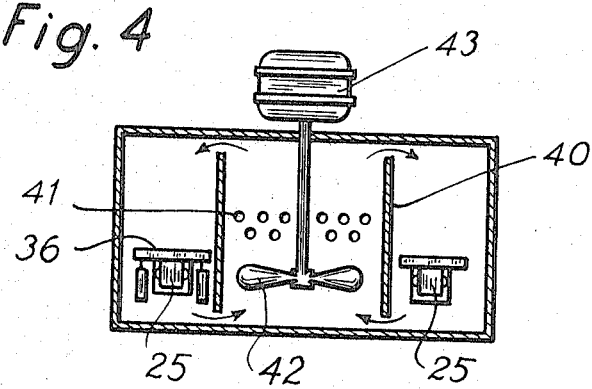
FIG. 4 is a section according to the line IV—IV in FIG. 3.
Figure 5:
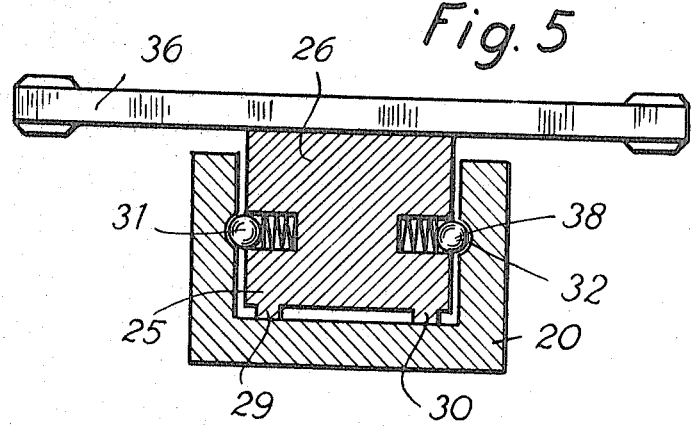
FIG. 5 is a section of the transport path with conveyor elements in the machine.
Figure 6:
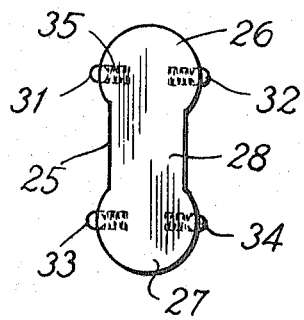
FIG. 6 is a top view of a conveyor element.

The machine shown in FIG. 1 employs a known bottle blowing apparatus having a lower frame 1 with upwardly directed guiding columns 2 and 3 for a table 4 which can be lowered and lifted by means of pressure means cylinders. On the table 4, two mold parts 5 and 6 are displaceably arranged which can be moved horizontally towards and away from each other by pressure means cylinders 7 and 8. Moreover, there is in the table 4 between the mold parts a vertical blowing nozzle 9 which can be moved up and down by means of pressure means cylinders (not shown).

Above the said bottle blowing apparatus, which preferably constitutes a separate unit independent of the rest of the machine, there is a transport mechanism which to all essentials consists of an endless chain which by means of a chain wheel (not shown) is arranged with a vertical path 10, a horizontal path 11, horizontal to-and-fro extending paths 12, 13, 14 and 15, an inclined path 16, an inclined path 17 and a horizontal path 18 which is connected to the lowermost end of the vertical path 10. On the chain are interspaced holding members which may consist of a short conical pin and two or three catching members which can be brought to press inwardly against the conical pin. These holding members are rotatably arranged on the chain links in such a manner that their axis of rotation is at right angles to the plane of the chain. In connection to the vertical path 10 there are guiding members, such as a link guide, cooperating with an arm on the rotatable holding members in which manner they are at least at the lower part of this path kept in position with the axis for the conical pin extending out to one side. At least part of the chain 10–18 is arranged in a box (not shown) through which is admitted a vertical current of air, e.g. an upwardly directed current of air. At the side of the path 10 there is a funnel 19 which has as shown two parallel sides and two other sides extending obliquely downward towards each other toward a narrow bottom opening the longitudinal edges of which are formed by the last mentioned sides. The distance between the two parallel sides is a little greater than the length of the work pieces to be used so that such work pieces can in great numbers lie in the funnel with their longitudinal direction at right angles to the parallel sides. The bottom opening has such a size that one work piece at a time can pass down through the same. Beneath the bottom opening there is a mechanism with means adapted to receive such a work piece and carry it in its longitudinal direction towards the path 10. A driving mechanism for these members and a driving mechanism for the chain 10–18 are synchronized in such a manner that the transfer of a work piece to the path 10 takes place when a set of holding members is located at the place in question of the path 10. The holding members may be guided in such a manner that the said catching members are at this place moved away from the conical pin so that the end of a tubular work piece can be brought into engagement with this pin whereafter the catching members are brought to press against the outer side of the work piece in towards the pin, e.g. by means of spring members actuating the catching members. Thereafter the said transfer members arranged beneath the funnel 19 are moved back to receive the next work piece from the funnel and so on.

Gradually as the holding members of the chain are moved into the path 11, the tubular plastic work pieces will on account of their weight swing down to vertical position as shown, and they will retain this position during the passage of the paths 12, 13, 14, 15 and 16. The driving mechanism of the chain may be so arranged that the movement takes place in steps in such a manner that it is stopped whenever a work piece has reached the lowermost position between the two inclined paths 16 and 17. The movement of the bottle blowing apparatus is furthermore adjusted to the movement of the chain 10–18 in such a way that the mold is to all essentials at the same time as a work piece carried to the position in question, brought into its upper position by a lifting of the table 4, and closed round the work piece by means of the pressure means cylinders 7 and 8. Immediately afterwards, air is blown through to nozzle 9 into the enclosed work piece so that the latter is brought into abutment against the inner side of the mold. Thereafter, the table 4 is lowered to such a position that there is room for the feeding of the next work piece to the place in question between the inclined paths 16 and 17 of the chain. When the bottle in the mold is stabilized, the mold is opened, the bottle ejected, and the table 4 lifted to receive the next work piece between the mold parts and so on. The movement of the chain 10–18 is adjusted according to the time necessary for the stabilization so that this time, practically speaking, determines the speed of production. By the passage through the said box or oven, the work pieces are heated by the vertical hot current of air. In order that the work pieces may also be heated from the inside, the conical pin of the holding members on the chain 10–18 may be hollow so that part of the air can pass up through the tubular work pieces and further on through the pin. Part of the heat may be transferred to the funnel 19 so that the work pieces are pre-heated. The chain 10–18 may, if desired, be driven continuously at relatively slow speed. However, this requires an exact synchronization of the various movable parts since the mold has to close around a work piece during the movement and the work pieces are to be moved on to the holding members during the movement. The holding members are preferably arranged in a replaceable manner so that it is possible to mount holding members for work pieces with another diameter in the same way as the holding members may be arranged with greater or smaller space between them on the chain. Accordingly, the feeding speed of the chain must be variable. Moreover, the temperature of the heating box must be able to be varied, or it may be done in the way that the work pieces are heated for a longer or shorter total distance adjusted according to thickness and the necessary temperature of the material in question. The heating box proper must be insulated, and may include surrounding return channels having air heating means. The blowing-up nozzle may be in its uppermost position when the table is lifted and pulled down when the mold is opened and immediately afterwards moved up again. It may, however, remain in its lower position during the lifting of the table and be moved quickly upwards into the tubular work piece after the lifting of the table. This will make the time especially short which must be allowed for the engagement of the blowing nozzle with the work piece. It is also possible to arrange the machine in such a manner that the mold is not moved up and down, but the work pieces are moved in between the mold parts, e.g. by an inclined or vertical movement. Thus, the work pieces can be carried from the chain to the mold by means of special holding members carrying a work piece at the time away from the holding members of the chain, e.g. in vertical direction in which manner the blowing nozzle may possibly cooperate by being moved up for engagement with the lower end of the work piece and thereafter with the work piece down to the mold.

It is also possible to have an embodiment where a conveyor band has a number of mandrils serving as holding members for tubular work pieces and arranged to function as blowing nozzles, e.g. in the way that when arriving at the mold they are put into connection with a compressed air pipe. Such mandrils may also be arranged upwardly directed or downwardly directed on the active distance of the conveyor band. In case of downwardly directed blowing mandril, the removal of the bottles will, after the opening of the mold, be particularly convenient.

The transport mechanisms may be arranged in many other ways than the one shown. The conveyor band may thus have vertical paths in lieu of the illustrated horizontal ones. The transport mechanism may also consist of a rotatable round table. The work pieces may, if desired, be supported at both ends during the transport, e.g. a mandril at one end and catching members at the other end.

Instead of a heating box it is possible to use a channel enclosing the traveling path of the work pieces. The holding members for the work pieces may be arranged for individual feeding in guiding members, especially by rollers guided in tracks, where the work pieces can be fed very closely during the heating and individually moved to a position for enclosure between the mold parts. Where a chain is employed, it is possible to have holding members on either side of the same, if desired, two or more sets of holding members on either side in which case there must be a corresponding number of molds next to each other on the table 4.

If desired, it will also be possible to transfer work pieces, one at a time, from a magazine to the mold, e.g. by means of a rotatable arm or the like transfer mechanism where the magazine has no real transport mechanism but may e.g. consist of of a funnel as the illustrated funnel 19. The magazine may in such a case be heated. The transfer mechanism may also be arranged in such a way that it keeps each of the work pieces for a time in a heating apparatus. In this way, it is possible, if desired, to heat different parts of the work piece differently.

It will also be possible for the blowing-up process to use heated air and possibly also to use a heated mold. In this case, it is possible to use completely cold or only comparatively slightly pre-heated work pieces so that in spite of a small thickness of goods they have a considerable stiffness when introduced into the mold.

If desired, the mold may be moved so that at least for part of the way it follows a work piece in the transport mechanism. In this case, it will not be necessary to undertake the feeding operation in steps. Such a movement of the mold may be obtained by placing the mold on a table which rotates, e.g. about a horizontal or vertical axis.

In lieu of extruding work pieces, it is possible to use injection molded work pieces or work pieces produced in another way.

Often it will be especially advantageous to use flat tubular pieces as material since this will give a convenient storing and transport. In the machine illustrated, it will, however, be advantageous that the tubular pieces have to all essentials a round cross section. However, this may be obtained by using tubular pieces having latent interior tensions. When such tubular pieces are placed in the funnel 19 and heated in the same they will straighten themselves out to a practically round cross section.

Instead of using a funnel 19 and a transfer mechanism from the funnel to the transport chain, an operator may manually fasten the tubular pieces on the transport chain thereby obtaining a more secure function of the chain. In this connection, it is possible with special advantage to use a transport mechanism where both ends of the tubular pieces are fastened, e.g. one end on a blowing mandril and the other end in the catching members.

The machine illustrated in FIGS. 2–6 has a bottle blowing apparatus as the one shown in FIG. 1, and the corresponding parts of the apparatus are indicated by the same reference numbers 1 to 9. The apparatus has, however, two molds arranged side by side and two associated blowing nozzles 9.

The machine is furthermore equipped with a heating and transport apparatus comprising a horizontal endless path formed by a rail 20 (FIG. 5) and comprising two semi-circular arcs 21 and 22, and two straight connecting paths 23 and 24. In the groove there are a number of conveyor elements 25 having rounded end parts 26 and 27 and a narrow central portion 28. The lower side is formed with sliding ribs 29 and 30 resting on the bottom of the rail 20. In the sides of the rounded end parts 26 and 27 there are partly projecting balls 31, 32, 33 and 34 loaded by pressure springs 35. On the upper side of the conveyor element is fastened a cross bar 36 which carries at either end a holding mechanism (not shown) for one end of a downwardly projecting hose piece of thermoplastic material. Each conveyor element has furthermore at the top a carrier member (not shown) cooperating with a driving arm 37 rotating with a constant speed of rotation and the vertical axis of rotation coincides with the vertical line through the center of the rail arc 21. The said carrier member on the conveyor element and the arm must be arranged for release from each other when the conveyor element is in the position in the middle of the rail arc 21, and there may be other members to insure that the conveyor element is retained precisely in the said position, e.g. a pin which can be brought into engagement with the side of the conveyor element. The sides of the rail have grooves 38 into which the balls 31—35 engage and are guided.

The rail arc 22 and the connecting paths 23 and 24 are enclosed in a flat casing 39 which by means of a vertical partition wall 40 is divided into an outer and inner section. The partition wall 40 has its upper edge slightly below the ceiling in the casing 39 and its lower edge slightly above the bottom of the casing. In the inner section of the casing there are heating elements 41 and a ventilator fan 42 driven by an electric motor 43. At the two places where the rail 20 extends out of the casing 39 there are tightening means, e.g. the so-called conveyor sluices. The casing 39 also includes an adjustable outlet opening 44 arranged in such a manner that there will be a slight suction from the said sluices. The casing 29 has at the transition between the rail arc 21 and the connecting path 24 an incision 45 serving as loading station for the plastic work pieces.

When using the machine illustrated in FIGS. 2–6, there is at either end of each of the cross bars 36 suspended a piece of hose of thermo-plastic material. This suspension may be undertaken manually or by a machine operation, in both cases at the incision 45. There are conveyor elements in such a number that they fill the whole rail 20 with the exception of the 90° of the rail arc 21, viz. from the path 23 to the middle of the arc 21. The arm 37 rotating with constant speed will by each rotation carry a conveyor element from the end of the path 23 to the middle of the arc 21 where the element will move all the other elements one step forward on the rail. To obtain a reduced conveyor speed of the feeding two or several arms 37 may be used. The release of the arm 37 from the conveyor element may be effected in the way that the arm is at the middle of the arc 21 lifted free of the carrier member of the element. The arm may be kept in its lifted position while it passes the conveyor elements on the 90° of the arc 21 from the middle of the same and up to the path 24.

The bottle blowing apparatus 1–9 is arranged in such a manner that the blowing nozzles 9 are located vertically under the holder members of the cross bar of a conveyor element which is in its central position on the rail arc 21. Immediately after the conveyor element has been brought to this position, the blowing nozzles are inserted into the two hose pieces, and the molds are closed around the latter whereafter air is blown into the hose pieces, and the table 4 with the molds is lowered. While the thus molded bottles are cooled for stabilization, the next conveyor element is moved to the middle of the arc 21. The molds are opened, the bottles removed, and the table lifted for the purpose of enclosing the next couple of hose pieces.

In FIG. 7, 51 is an extruder having a horizontal extruder arm 52 extending from the extruder head 53 from which there is continuously and with constant speed extruded a hose 54 of thermo-plastic synthetic material, such as polyvinylchloride or polyethylene. The hose is passed through a cooling apparatus 55 arranged in the vicinity of the extruder head 53, which cooling apparatus is preferably arranged as a calibrating apparatus as is the normal process for the production of garden hoses and similar articles. From the cooling apparatus 55 the hose 54 is carried through guiding rollers 56 to a driving roller 57 and from there obliquely upwards and past a guiding roller 58 and down between the latter and a driving roller 59. From here the hose 54 is carried vertically down through a heating apparatus 60 having a vertical through channel for the hose. Uniformly distributed round this channel the heating apparatus 60 may have heating lamps or the like radiation heating members, preferably with depth effect. Along the lower edge of the heating apparatus a knife is displaceably driven by a pressure means cylinder 61. Beneath the heating apparatus is arranged as so far known bottle blowing apparatus as the one shown in FIG. 1.

During the working of the machine shown in FIG. 7, hose 54 is as mentioned extruded continuously and at a constant speed, and from the heating apparatus is fed continuously and at constant speed such hose material as has been cooled and calibrated in the cooling apparatus 55 so that it has a uniform character. The cooling and the distance between the cooling apparatus 55 and the heating apparatus 60 may be arranged in such a way that when it arrives at the heating apparatus the hose is comparatively cold on the outside but has an elevated temperature in the interior, e.g. such a temperature as will enable the inner parts of the hose to stand a strong transformation, especially a considerable stretching, but still a temperature which is essentially lower than the extruding temperature and lower than the temperature at which extruding takes place in the hitherto known bottle blowing methods with a direct transfer of the extruded material to the mold. In the heating apparatus especially, the outer parts of the hoses are heated.

The machine functions in the way that as the table 4 with the open mold 5, 6 is lifted, the mold is closed round a piece of hose hanging down from the heating apparatus, and a cutting is undertaken by means of the knife driven by the pressure means cylinder 61. Thereafter a blowing-up is undertaken of the hose piece present in the mold by means of the blowing nozzle 9 projecting vertically up into the mold, which blowing nozzle also forms the molding core for the bottle neck. At the same time, the table 4 with the mold 5, 6 is lowered thus making room for the continued downward movement of the hose 54. When the bottle formed in the mold 5, 6 by the blowing-up operation is stabilized, the mold is opened, and the bottle removed, whereafter the table is again lifted. This series of operations is adjusted to the speed of the movement of the hose in such a manner that after the lifting of the table the mold can immediately close round a fresh piece of hose.

The illustrated and described embodiments and the methods described in connection herewith are only to be considered as examples seeing that within the scope of the invention many variations are possible. Thus, it will be possible, without any further arrangement, to let the hose leaving the cooling apparatus 55 be transferred to storing coils thus working up a store of hose, and such hose may later at a convenient moment be passed through the heating apparatus 60 to the bottle blowing apparatus proper. It will, of course, also be possible to buy such hose and let it pass the heating apparatus. When such stored articles are used it will probably be advantageous to let the hose pass a comparatively long heating apparatus before it is introduced into the heating apparatus which is meant to give the hose a short intensive heating. In such a pre-heating, the hose may in its entire thickness be heated to a temperature in the vicinity of the plasticity boundary. It will also be possible to work with a band material of another profile, e.g. ribbon-shaped, in which case a welding together must be undertaken in the mold. Such a welding together may be rendered more easy by arranging the heating apparatus so that it is capable of giving the zones in question an esepcially strong heating. It is also possible to allow the hose to pass through the heating apparatus in steps. Where, as in FIG. 7, the hose is fed from an extruder, it will be practical in order to obtain such a movement in steps between the extruder and the heating apparatus to insert movable guiding rollers. For instance, the rollers 58 and 59 might be vertically movable in time with the speed of extruding so that for a certain time of the period they move comparatively slowly upwards whereby the hose is kept still in the heating apparatus, and for another part of the period they are moved comparatively quickly downwards. By this arrangement, it is obtained that it is not necessary to move the table 15 with the mold up and down, or to undertake any other movement of the mold in order to move it away from the zone immediately under the heating apparatus 60. In such a movement in steps it will, moreover, be easy to undertake a heating varied according to the longitudinal direction of the hose so that an adaptation may be undertaken according to the molding and welding conditions on the various places in the mold. It will also be possible to effect the cutting of the hose at a time other than the one explained in connection with FIG. 7. Thus, the hose may be cut before being fed into the heating apparatus thereby rendering it possible to undertake an inner heating of the hose. Such cut hose pieces may be moved in the lateral direction up to the place in the heating apparatus from where they are to be transferred to the mold. By such cutting it will on the whole be possible to obtain the advantage that the method and the apparatus can be varied considerably in many respects. On the other hand, said cutting before the introduction into the heating apparatus causes that special holding members for the hose pieces must be arranged for.

What is claimed is:

1. An apparatus for manufacturing hollow articles from thermoplastic material work pieces by molding in sequence, which comprises at least one mold having a pair of separable parts, means for opening said mold, a transport mechanism including an endless conveyor belt for carrying said thermoplastic work pieces through a heating device and to a position directly adjacent said mold after emerging from said heating device, members on said belt for engaging one end of each work piece and suspending it from its top in a generally perpendicular orientation while carrying the work pieces one at a time in between the mold parts, means for closing the mold parts about said work pieces while they are suspended from said conveyor belt, and means for blowing up a work piece placed in the closed mold.

2. The apparatus as claimed in claim 1, wherein means are provided for moving said mold between two positions, where in one position it is closed around a work piece fed by the conveyor belt, means for moving said mold in closed condition to a second position, thereby vacating the initial position of said mold.

3. The apparatus as claimed in claim 1, wherein the transport mechanism is arranged for stepwise feeding of the work pieces and for retaining each work piece for a short time at the place where the mold is operated to close around the work piece.

4. The apparatus as claimed in claim 1, wherein means are provided for moving the mold in vertical direction.

5. Apparatus for manufacturing hollow articles from thermoplastic material in a molding machine which comprises in combination an endless conveyor for feeding a plurality of pre-formed tubular pieces of said material for further shaping in sequence, means for holding said tubular pieces individually suspended from their top in vertical position from said conveyor, means for heating said tubular pieces while they are suspended from their top and fed toward a molding station, said conveyor including a portion passing directly adjacent the molding station and means for moving the molding station of said molding machine into surrounding relationship about said tubular pieces while said pieces remain suspended from said conveyor.

6. Apparatus for manufacturing hollow articles from preformed parisons at substantially ambient temperature made of thermoplastic material comprising, in combination, a molding machine having a molding station, an oven having an entry opening and a discharge opening for raising the temperature of said parisons to molding temperature, and a conveyor mechanism for transporting said preformed parisons through said oven to the molding station of said molding machine; said conveyor mechanism including a plurality of individual and separably movable mandrel conveyor elements upon which at least one preformed parison may be mounted, means for guiding said mandrel conveyor elements in an endless pathway passing through said oven, molding station and back to said oven, and means for intermittently and periodically moving one of said mandrel conveyor elements from the discharge opening of said oven into said molding station to thereby force the previously blow-molded parison and its associated mandrel conveyor element from said molding station along said endless pathway toward the entry opening of said oven.

7. Apparatus according to claim 6 wherein each of said mandrel conveyor elements includes at least one cross-bar having means at opposite ends thereof for supporting a pair of parisons from their top in a pendant position.

8. Apparatus in accordance with claim 6 wherein said guiding means includes a U shaped channel having grooves formed in the inner side walls thereof, said mandrel conveyor elements including bearing means cooperative with and engaging said grooves to maintain and slidably mount said elements in said guiding means.

9. Apparatus in accordance with claim 7 wherein said oven includes a pair of spaced internal partition walls and blower means therebetween and cooperative therewith to circulate heated air over and around said mandrel conveyor elements and the parisons suspended therefrom.

References Cited

UNITED STATES PATENTS

| | | | |
|---|---|---|---|
| 2,819,490 | 1/1958 | Froot | 18—5 |
| 2,978,745 | 4/1961 | Langecker | 18—5 X |
| 3,079,631 | 3/1963 | Gasmire | 18—5 X |
| 3,079,637 | 3/1963 | Marzillier | 18—5 X |
| 3,186,028 | 6/1965 | Dobbins et al. | 18—5 |

FOREIGN PATENTS 1,261,774  4/1961  France.

J. SPENCER OVERHOLSER, *Primary Examiner.*

W. L. McBAY, *Assistant Examiner.*